(12) United States Patent
Menichelli et al.

(10) Patent No.: US 11,402,523 B2
(45) Date of Patent: Aug. 2, 2022

(54) SCINTILLATING DETECTORS FOR QUALITY ASSURANCE OF A THERAPY PHOTON BEAM

(71) Applicant: Ion Beam Applications S.A., Louvain-la-Neuve (BE)

(72) Inventors: David Menichelli, Postbauer-Heng (DE); Timo Hausbeck, Neumarkt in der Oberpfalz (DE); Lutz Müller, Nuremberg (DE)

(73) Assignee: ion Beam Applications S.A., Louvain-la-Neuve (BE)

( * ) Notice: Subject to any disclaimer, the term of this patent is extended or adjusted under 35 U.S.C. 154(b) by 3 days.

(21) Appl. No.: 17/262,066

(22) PCT Filed: Jul. 22, 2019

(86) PCT No.: PCT/EP2019/069709
§ 371 (c)(1),
(2) Date: Jan. 21, 2021

(87) PCT Pub. No.: WO2020/020840
PCT Pub. Date: Jan. 30, 2020

(65) Prior Publication Data
US 2021/0311212 A1   Oct. 7, 2021

Related U.S. Application Data

(60) Provisional application No. 62/701,890, filed on Jul. 23, 2018.

(51) Int. Cl.
*G01T 1/29*  (2006.01)
*G01T 1/203*  (2006.01)

(52) U.S. Cl.
CPC ............ *G01T 1/2921* (2013.01); *G01T 1/203* (2013.01)

(58) Field of Classification Search
None
See application file for complete search history.

(56) References Cited

U.S. PATENT DOCUMENTS

2005/0139758 A1   6/2005  White et al.
2015/0360056 A1* 12/2015  Xing .................... A61N 5/1049
250/362

(Continued)

FOREIGN PATENT DOCUMENTS

EP         2 939 708          11/2015

OTHER PUBLICATIONS

International Search Report and Written Opinion, dated Sep. 25, 2019, in corresponding International Application No. PCT/EP2019/069709 (12 pages).

*Primary Examiner* — Edwin C Gunberg
(74) *Attorney, Agent, or Firm* — Finnegan, Henderson, Farabow, Garrett & Dunner LLP

(57) ABSTRACT

The present disclosure relates to scintillating detector systems for radiation therapy beams. In one implementation, a detector system for evaluating radiation delivered by a radiation beam output from a beam generator may include a phantom enclosing an internal volume and having an outer surface, extending around the internal volume, for exposure to radiation, and an inner surface coated, at least in part, with a scintillating material and facing the internal volume. The system may further include a camera external to the enclosed volume and configured to view at least a portion of the inner surface, through an opening of the hollow phantom, when radiated by the radiation beam. The system may further include at least one processor configured to receive images from the camera and calculate, based on the received images, a spatial dose distribution produced by the radiation delivered by the radiation beam to the hollow phantom.

17 Claims, 8 Drawing Sheets

(56) References Cited

U.S. PATENT DOCUMENTS

| | | | |
|---|---|---|---|
| 2016/0041270 A1* | 2/2016 | Dai | G01T 1/023 |
| | | | 250/361 R |
| 2016/0049216 A1* | 2/2016 | Nelson | G01T 1/29 |
| | | | 250/362 |
| 2018/0339174 A1* | 11/2018 | Kilby | A61N 5/1065 |

* cited by examiner

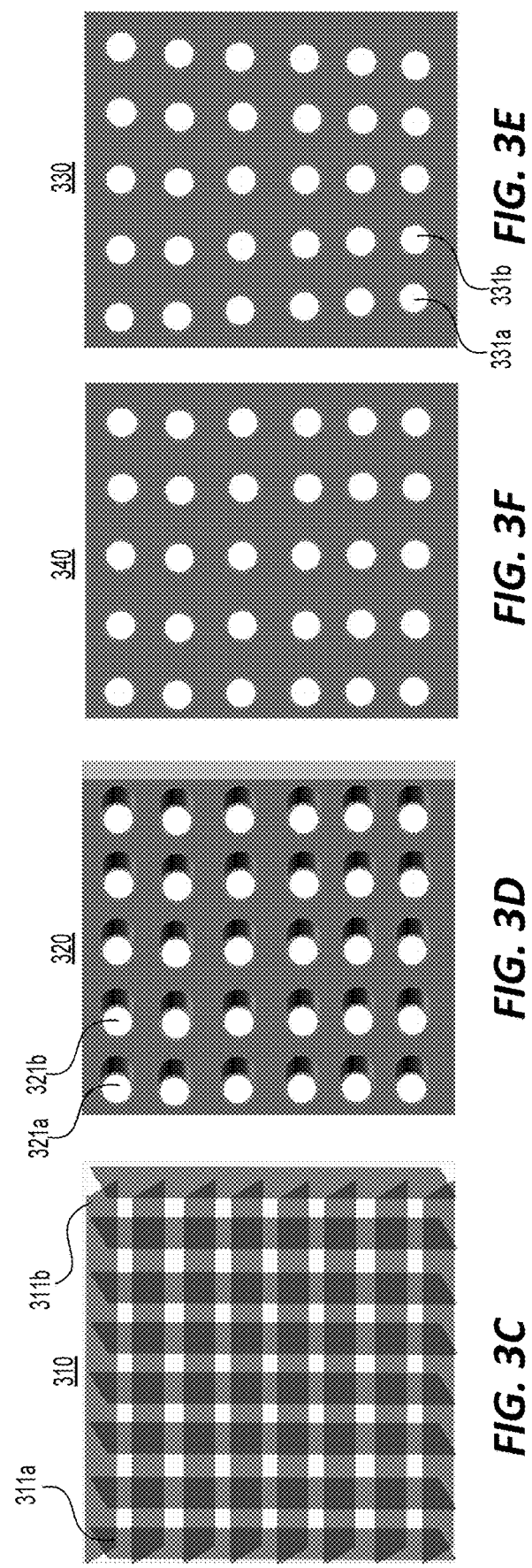

SCINTILLATING DETECTORS FOR QUALITY ASSURANCE OF A THERAPY PHOTON BEAM

CROSS-REFERENCE TO RELATED PATENT APPLICATIONS

This application is the National Stage under 35 U.S.C. § 371 of International Application No. PCT/EP2019/069709, filed Jul. 22, 2019, which claims the benefit of priority of U.S. Provisional Patent Application No. 62/701,890, filed Jul. 23, 2018, which are hereby incorporated by reference in their entireties.

TECHNICAL FIELD

This disclosure relates generally to the field of radiotherapy phantoms with integrated detectors. More specifically, and without limitation, this disclosure relates to scintillating detectors for a photon beam.

BACKGROUND

In radiation therapy, a phantom is often used to determine characteristics of a photon beam to be used for treatment. For example, the phantom may be used to verify if the beam sequence applied to the patient fulfills the clinical requirements or to adjust the beam prior to treating a patient or subject.

However, most of such phantoms use a plurality of single detectors to characterize the photon beam. Accordingly, phantoms may be costly to produce if a high number of detectors is used. In addition, most detector or sensor configurations fail to achieve spatial resolution better than 5 mm. Moreover, some treatments, like stereotactic treatments, may require spatial resolution of about 1 mm, which most existing phantoms cannot provide.

SUMMARY

Systems and methods of the present disclosure may include scintillating detectors having greater spatial resolution than extant detectors. For example, by using light emission from scintillating material, embodiments of the present disclosure may allow for more accurate quality assurance of a particular beam. Furthermore, some embodiments may use one or more additional detectors placed in the isocenter or other special points of interest. Moreover, mirrors or totally reflecting surfaces might be used to increase the field of view for the scintillation light or to further improve the spatial resolution provided by the scintillating detector and to embed the scintillating zone in a material selected for dosimetric properties.

According to an exemplary embodiment of the present disclosure, a scintillating detector for evaluating radiation delivered by a radiation beam may comprise a phantom enclosing an internal volume and having: an outer surface, extending around the internal volume, for exposure to radiation, and an inner surface coated, at least in part, with a scintillating material and facing the internal volume; a camera external to the enclosed volume and configured to view at least a portion of the inner surface, through an opening of the phantom, when radiated by the radiation beam; and at least one processor configured to receive images from the camera and calculate, based on the received images, a spatial dose distribution produced by the radiation delivered by the radiation beam to the phantom.

In some embodiments, the phantom may be translationally symmetric along at least one axis. For example, the phantom may be cylindrical.

Additionally or alternatively, the phantom may be not rotationally symmetric about the at least one axis. For example, the phantom may have an elliptical cross section.

In any of the embodiments above, the phantom is made of plastic. Additionally or alternatively, the volume may be filled with a light transparent material (e.g., in order to include radiation backscatter effects). Additionally with or alternatively to a solid transparent filling, water or another transparent liquid may fill the volume of the phantom.

In any of the embodiments above, the system may further comprise one or more point sensors placed along an axis of the volume (or in other points of interest). The point sensor may be held in place by a holder connected to a wall of the hollow phantom. In some embodiments, the point sensor may also be made out of scintillating material and may be placed in a field of view of the camera.

In any of the embodiments above, the device may further comprise one or more reflective surfaces placed between the scintillating material and an axis of the phantom.

According to another exemplary embodiment of the present disclosure, a method of determining a dose distribution created by a radiation beam may comprise controlling a radiation generator to generate the radiation beam, controlling a delivery system to deliver the radiation beam to a phantom having a scintillating material for a particular time, receiving images of the phantom receiving the radiation beam converting the received images created by scintillation light to doses, and integrating the doses over time to obtain the resulting dose distribution.

In some embodiments, the method may further comprise comparing the dose distribution to a predicted dose distribution; and applying one or more corrections to the measured images. For example, the one or more corrections may include at least one of a correction for the incident energy, a correction for the energy distribution, a correction for geometric distortion, and a correction for the angle of incidence. For example, the one or more corrections may be applied to the measured images during the conversion of the images to a dose distribution, in order to compensate for effects related to the sensor response limiting its dosimetric performances.

Another possibility is to apply the correction to the predicted dose distribution, and to convert the corrected predicted dose distribution to a predicted measured signal (e.g., predicted images). In this case, the measured images may be directly compared to the predicted images.

According to another exemplary embodiment of the present disclosure, a method of determining positional dose distributions of a radiation beam may comprise controlling a scanner (e.g., a Computed Tomography (CT) or Magnetic Resonance Imaging (MRI) scanner) to perform a scan of a phantom having a scintillating material; controlling a radiation generator to generate the radiation beam; controlling a delivery system to deliver the radiation beam to the phantom for a particular time; receiving images of the phantom receiving the radiation beam; converting the received images to doses based on signals output by the scintillating material; integrating the doses over time obtain to the dose distribution; and determining positional dose distributions based on the dose distribution and the scan of the phantom.

In addition to or alternative to using the scan to map the dose distributions to positions, the scan may be used, in combination with a radiation treatment plan, to predict positional dose distributions over the phantom. Accordingly, the predicted positional dose distributions may be compared with the determined positional dose distributions, as explained further below.

In some embodiments, the method may further comprise comparing the positional dose distributions to predicted positional dose distributions; and applying one or more corrections to the measured images. As explained above, the one or more corrections may include at least one of a correction for the incident energy, a correction for the energy distribution, a correction for geometric distortion, and a correction for the angle of incidence. For example, the one or more corrections may be applied to the measured images during the conversion of the images to a dose distribution, in order to compensate for effects related to the sensor response limiting its dosimetric performances.

As explained above, the possibility is to apply the correction to the predicted dose distribution, and to convert the corrected predicted dose distribution to a predicted measured signal (e.g., predicted images). In this case, the measured images may be directly compared to the predicted images.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings:

FIG. 3C is a schematic representation of an anti-scattering grid for use in a scintillating detector, according to an exemplary embodiment of the present disclosure.

FIG. 3D is a schematic representation of a pixel mask for use in a scintillating detector, according to an exemplary embodiment of the present disclosure.

FIG. 3E is a schematic representation of a distorted image of the pixel mask of FIG. 3D.

FIG. 3F is a schematic representation of a corrected image of the pixel mask of FIG. 3D.

DETAILED DESCRIPTION

Figure 1A:
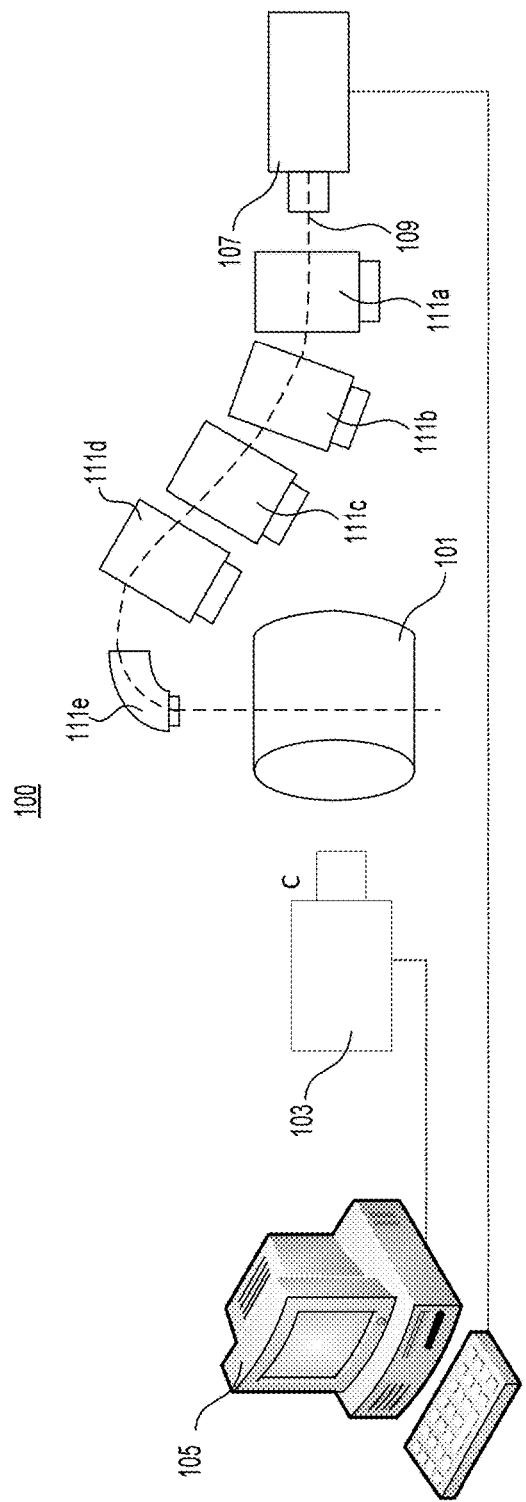
FIG. 1A is a schematic representation of a scintillating detector, according to an exemplary embodiment of the present disclosure.

The disclosed embodiments relate to scintillating detectors and methods of use of the same. For example, embodiments of the present disclosure may be used to perform quality assurance on a radiation beam.

According to an embodiment of the present disclosure, a detector system for evaluating radiation delivered by a radiation beam output from a beam generator may comprise a hollow phantom enclosing a volume or cavity and having an outer surface for exposure to radiation and an inner surface coated, at least in part, with a scintillating material. The hollow phantom may comprise any shape. For example, the hollow phantom may have translational symmetry along at least one axis. Accordingly, the hollow phantom may be cylindrical. Additionally or alternatively, the hollow phantom may not be rotationally symmetrical about the at least one axis. Accordingly, the hollow phantom may have an elliptical, rather than circular, base.

In any of the embodiments above, the hollow phantom may further comprise an end cap. For example, the end cap may comprise a semi-spherical, semi-ellipsoid, or the like. Additionally or alternatively, the hollow phantom may have a cross-sectional area that decreases along at least one axis. For example, the hollow phantom may have a circular or elliptical cross-section with a radius or an axis that decreases along an axis of the hollow phantom.

The inner surface may be coated, at least in part, with a scintillating material. For example, the scintillating material may comprise an inorganic or organic scintillator, such as anthracene, stilbene, naphthalene, a scintillating solution, or the like. Additionally or alternatively, the scintillating material may comprise a plastic scintillator having a fluor suspended in or bonded to a base comprising a polymeric matrix. Accordingly, when the radiation passes through the phantom, the scintillating material will transmit a signal, i.e., illuminate, due to the radiation. The scintillating surface may be uniformly coated or sub-divided into one or more smaller scintillating spots. Additionally with or alternatively to sub-division into scintillating spots, a pixel mask with narrow openings may provide a granular light emission from the phantom.

Although described as "coated," the inner surface may comprise scintillating material in other ways. For example, a foil of scintillating material may be placed or otherwise attached (e.g., via adhesive or the like) to the phantom such that the foil comprises the inner surface. In such embodiments, the foil or other scintillating material placed on or otherwise attached to the phantom may be uniform or sub-divided into one or more smaller scintillating spots.

The scintillating detector may further comprise a camera (e.g., comprising a lens system and converter to electrical signal, like a CCD or CMOS sensor) external to the enclosed volume and configured to view at least a portion of the inner surface through an opening of the hollow phantom. Accordingly, the camera may capture images of the illumination of the scintillating material caused by the radiation. In some embodiments, an accelerator used to generate the radiation may generate short pulses, e.g., having a period between 1 ms and 10 ms. Accordingly, the images may be synchronized with the pulses in order to increase the signal-to-noise ratio. The camera may capture such images sequentially during a particular treatment time. The camera may further include optical filters to limit the sensitivity to a wavelength band or to cut-off the lower or higher end of the wavelength spectrum. The camera (optionally with its lens) may be embedded in air, water or another transparent gas or liquid.

The scintillating detector may further comprise at least one processor configured to receive images from the camera and calculate a representation of a dose of the radiation based on the received images. For example, the at least one processor may use one or more properties of the illumination radiation such as wavelength, brightness, shape, or the like, to determine properties of the beam, such as amplitude, wavelength, energy spread, or the like. These properties may be mapped onto known locations of the scintillating material to determine positional dose distributions of the radiation. For example, the known locations may be derived from a scan of the hollow phantom, e.g., a computed tomography (CT) scan.

The at least one processor may adjust brightness of one or more first pixels corresponding with scintillating portions of the received images based on brightness of one or more second pixels corresponding with non-scintillating portions of the received images. For example, as explained above, the inner surface may be sub-divided into one or more smaller scintillating spots. Accordingly, the one or more scintillating spots may result in scintillating portions of the images captured by the camera while the non-scintillating spots (also called "dark" spots) may result in the non-scintillating portions (also called "dark" portions) of the images captured by the camera. Similarly, in embodiments where the foil or other scintillating material placed on or otherwise attached to the phantom is sub-divided into one or more smaller scintillating spots, the one or more scintillating spots may result in scintillating portions of the images captured by the camera while the non-scintillating spots (also called "dark" spots) may result in the non-scintillating portions (also called "dark" portions) of the images captured by the camera.

Reference will now be made in detail to exemplary embodiments and aspects of the present disclosure, examples of which are illustrated in the accompanying drawings.

FIG. 1A is a schematic representation of a scintillating detector 100. Detector 100 may comprise a hollow phantom 101. As described above, hollow phantom 101 may be cylindrical. Alternatively, hollow phantom 101 may have an elliptical cross-section and/or may have a cross-sectional area that decreases along at least one axis. Detector 100 may further comprise a camera 103. Camera 103 is configured to view the inner surface of phantom 101 through an opening facing camera 103. The opening may comprise an uncovered surface of phantom 101 or may comprise a transparent material (whether solid or liquid, as discussed above) through which camera 103 may obtain images of the inner surface of phantom 101.

As further depicted in FIG. 1A, detector 100 may comprise a computer 105 or other processing device (such as a central processing unit (CPU), graphics processing unit (GPU), field-programmable gate array (FPGA), application specific integrated circuit (ASIC), or the like) to perform analysis on images captured by camera 103. Although depicted as separate in FIG. 1A, computer 105 may be integrated with camera 103, e.g., by using one or more integrated circuits (ICs) of camera 103 to perform the analysis.

As further depicted in FIG. 1, phantom 101 may receive a radiation beam 109 generated by radiation generator 107. Generator 107 may comprise a linear accelerator (LINAC) system or other system that generates radiation beam 109. In addition, a delivery system may direct radiation beam 109 to phantom 101. For example, as depicted in FIG. 1, the delivery system may comprise a plurality of magnets, such as bending magnets 111a, 111b, 111c, and 111d and/or focusing magnets, such as focusing magnet 111e. The magnets may comprise dipole magnets, quadrupole magnets, or any combination thereof. As known in the art, the linear accelerator may generate a radiation beam 109 for delivery to a patient for treatment or, as discussed more below, to phantom 101. The disclosed embodiments may be used with any known type of linear accelerator used to deliver a radiation beam for radiation therapy purposes, such as linear accelerators having a rotatable gantry, having a kilovoltage (KV) imaging system, or a megavoltage (MV) imaging system.

Computer 105 may perform image analysis functions on images from camera 103 in order to calculate a representation of a dose of a radiation delivered to phantom 101. The representations may be spatial, temporal, or integrated, at least in part, over space and/or time. Computer 105 may further compare the calculated dose representation to a predicted dose representation. Deviations from the predicted dose representation may be used to adjust the accelerator or radiation source used for treatment, and/or to adjust one or more lenses or other focusing instruments used to direct the radiation to phantom 101. Alternatively, computer 105 may use a predicted dose to derive an expected measurement (e.g., an expected light intensity) from camera 103. Computer 105 may then compare the expected measurement to the actual measurement, and to then perform adjustments accordingly, as explained above. Computer 105 may, for example, be part of a conventional treatment planning system used, as known in the art, to generate a radiation treatment plan and control a linear accelerator system in order to deliver a radiation beam for treating a patient in accordance with the generated radiation treatment plan.

Figure 1B:
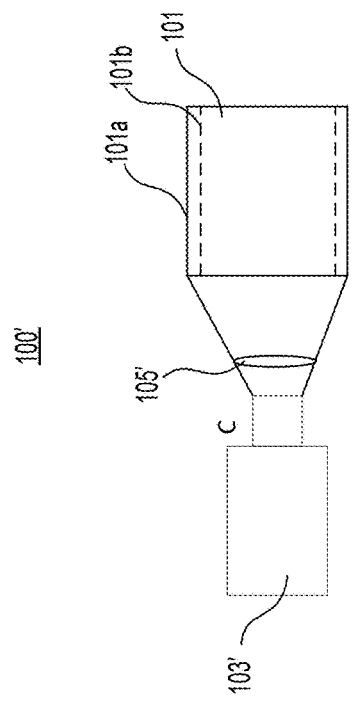
FIG. 1B is a schematic representation of another scintillating detector, according to an exemplary embodiment of the present disclosure.

FIG. 1B is a schematic representation of another scintillating detector 100'. Detector 100' may comprise a hollow phantom 101 as depicted in FIG. 1A. As depicted in FIG. 1B, phantom 101 may comprise an outer surface 101a for receiving radiation. For example, outer surface 101a may comprise a plastic shell. As further depicted in FIG. 1B, phantom 101 may comprise an inner surface 101b made of a scintillating material. Although not depicted in FIG. 1A, outer surface 101a and inner surface 101b are also present in phantom 101 of FIG. 1A.

As used herein, the term "surface" refers to a three-dimensional surface having depth (e.g., a layered surface)

and not merely to the two-dimensional surface area of an object. For example, the outer surface 101a may comprise a plurality of plastic layers bonded together to form the plastic shell that encloses a cavity or space. In another example, inner surface 101b may comprise a supporting plastic as well as the scintillating material (or a plurality of scintillating layers) bonded together. As explained above, the scintillating material may be arranged as a uniform layer or may be sub-divided into pixels or other smaller regions optically isolated from each other. Surface 101a is referred to as an "outer" surface because it is provided on top of an "inner" surface (surface 101b). In other words, the terms "inner" and "outer" are used to relate the surfaces relative to each other rather than relative to any absolute measure.

As further depicted in FIG. 1B, camera 103' may be integrally formed with phantom 101. For example, one or more supports may connect camera 103' to phantom 101. Moreover, camera 103' may be focused by one or more lenses, e.g., lens 105', installed between camera 103' and phantom 101. Although not depicted in FIG. 1B, computer 105 of FIG. 1A may also be included in detector 100'.

Figure 2A:
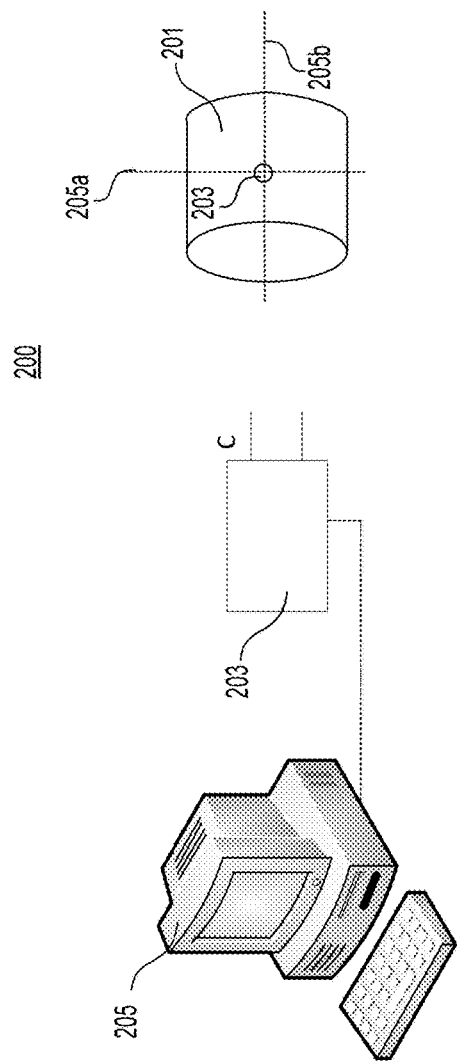
FIG. 2A is a schematic representation of a scintillating detector with an isocenter sensor, according to an exemplary embodiment of the present disclosure.

FIG. 2A is a schematic representation of a scintillating detector 200. Detector 200 may comprise a hollow phantom 201. Hollow phantom 201 may be similar to hollow phantom 101 of FIGS. 1A and 1B. In addition, camera 203 and computer 205 may be similar to camera 103 of FIG. 1A (or camera 103' of FIG. 1B) and computer 105 of FIGS. 1A and 1B, respectively.

As depicted in FIG. 2A, phantom 201 may further comprise an isocenter sensor 203. For example, isocenter sensor 203 may comprise any type of sensor, such as an ionization chamber, luminescent sensor, or the like. Alternatively, the isocenter sensor 203 may comprise a small body having an internal cavity visible to camera 203 and coated with the same scintillating material used on the inner surface of phantom 201. Accordingly, isocenter sensor 203 may produce measurements dependent on the relationship between the thickness of the scintillating material and the radiation strength rather than on the details of the sensor surface.

As further depicted in FIG. 2A, isocenter sensor 203 may be centered on one or more axes of phantom 201. For example, isocenter sensor 203 is centered on axis 205b, around which phantom 201 has translational symmetry. In addition, isocenter sensor 203 is centered on axis 205b, which may represent an axis of the radiation.

Figure 2B:
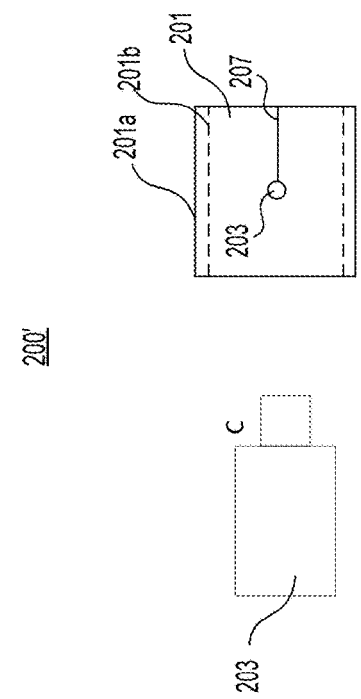
FIG. 2B is a schematic representation of another scintillating detector with an isocenter sensor, according to an exemplary embodiment of the present disclosure.

FIG. 2B is a schematic representation of another scintillating detector 200'. Detector 200' may comprise a hollow phantom 201 and a camera 203, as depicted in FIG. 2A. Although not depicted in FIG. 2B, computer 205 of FIG. 2A may also be included in detector 200'.

As depicted in FIG. 2B, phantom 201 may comprise an outer surface 201a for receiving radiation. For example, outer surface 201a may comprise a plastic shell. As further depicted in FIG. 2B, phantom 201 may comprise an inner surface 201b made of a scintillating material. Although not depicted in FIG. 2A, outer surface 201a and inner surface 201b are also present in phantom 201 of FIG. 2A.

As further depicted in FIG. 2B, phantom 201 may further comprise an isocenter sensor 203 as depicted in FIG. 2A. Isocenter sensor 203 may be held in place using holder 207. Holder 207 may connect to any portion of inner surface 201b. To avoid interfering with camera 203, holder 207 may connect to a portion of inner surface 201b further from camera 203 than isocenter sensor 203. Although not depicted in FIG. 2A, holder 207 may also present in phantom 201 of FIG. 2A.

Figure 3A:
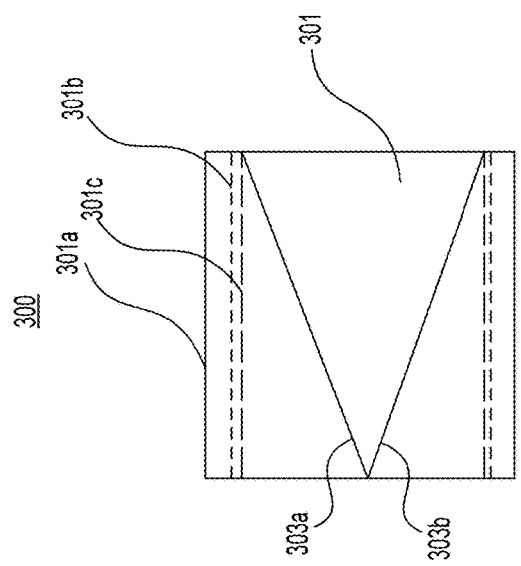
FIG. 3A is a schematic representation of a scintillating detector with reflective surfaces, according to an exemplary embodiment of the present disclosure.

FIG. 3A is a schematic representation of a hollow phantom 300, which may be used in a scintillating detector of the present disclosure. Hollow phantom 300 may be similar to hollow phantom 101 of FIGS. 1A and 1B.

As depicted in FIG. 3A, phantom 300 may enclose a volume 301 and may comprise an outer surface 301a for receiving radiation. For example, outer surface 301a may comprise a plastic shell. As further depicted in FIG. 3A, phantom 300 may comprise an inner surface 301b made of a scintillating material. Phantom 300 may also include one or more optical anti-scattering grids 301c to prevent reflectors 303a and 303b from scattering light from a direction non-normal to the scintillator shell of phantom 300.

As further depicted in FIG. 3A, phantom 300 may include one or more reflective surfaces, e.g., reflectors 303a and 303b. Reflectors 303a and 303b may reflect any signal generated by inner surface 301b toward the camera (not shown). This may allow for the entire image of the camera to include information about the radiation rather than only a portion of the image. In such an embodiment, the computer (not shown) may have to perform post-processing on the received images to correct for distortions in the image caused by reflectors 303a and 303b, e.g., based on known locations and shapes of reflectors 303a and 303b.

Figure 3B:
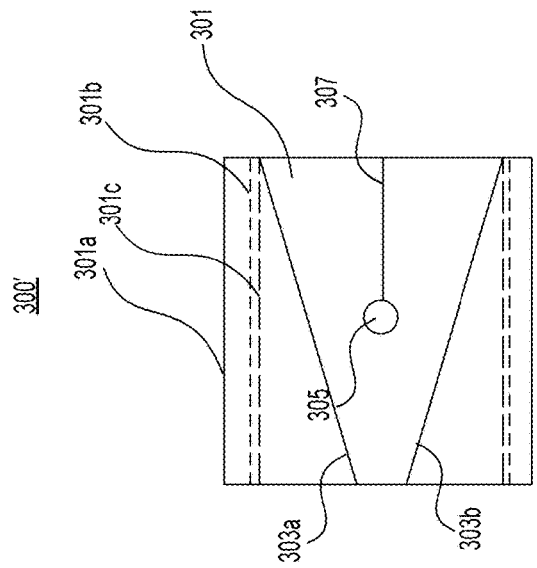
FIG. 3B is a schematic representation of a scintillating detector with reflective surfaces and an isocenter sensor, according to an exemplary embodiment of the present disclosure.

FIG. 3B is a schematic representation of a phantom 300', which may be used in a scintillating detector of the present disclosure. Phantom 300' may enclose a volume 301 as depicted in FIG. 3A.

Similar to FIG. 3A, phantom 300' may comprise an outer surface 301a for receiving radiation. For example, outer surface 301a may comprise a plastic shell. In addition, phantom 300' may comprise an inner surface 301b made of a scintillating material. Phantom 300' may also include one or more anti-scattering grids 301c to prevent reflectors 303a and 303b from scattering light from a direction non-normal to the scintillator shell of phantom 300'.

Similar to FIG. 3A, phantom 300' may include one or more reflective surfaces, e.g., reflectors 303a and 303b. Reflectors 303a and 303b may reflect any signal generated by inner surface 301b toward the camera (not shown). As further depicted in FIG. 3B, phantom 300' may include an isocenter sensor 305 similar to sensor 203 depicted in FIGS. 2A and 2B. In addition, isocenter sensor 305 may be held in place by holder 307 similar to holder 207 depicted in FIG. 2A.

In any of the embodiments depicted in FIG. 1A, 1B, 2A, 2B, 3A, or 3B, the hollow phantom may further include an anti-glare filter (or anti-scatter grid 301c, as described with respect to FIG. 3A) on the inner surface of the scintillator grid. This filter (or grid) may ensure that light rays leave the scintillator only in the normal direction or the direction which leads to a direct image on the camera sensor. This may reduce glare present in the received images, resulting in both improved spatial resolution and reducing post-processing needs.

In any of the embodiments depicted in FIG. 1A, 1B, 2A, 2B, 3A, or 3B, the hollow phantom may be filled with a solid or liquid that is transparent to the signal emitted by the scintillating material. Accordingly, in FIGS. 3A and 3B, reflectors 303a and 303b may comprise an interface between the solid or liquid filling the phantom and air surrounding isocenter sensor 305 or at least a middle portion of the phantom. For example, reflectors 303a and 303b may comprise a plastic acting as an interface between the solid or liquid filling the phantom and the air.

Moreover, in such embodiments, Cherenkov radiation may be emitted in the backscatter medium (that is, the solid or liquid filling the phantom). This may be, for example, concentrated in the blue spectral range. Accordingly, in such embodiments, the scintillator material may be selected to emit at a different wavelength (e.g., red) and/or using a filter (e.g., an edge or a band-pass filter) in front of the camera (not shown) in order to discriminate the signal from the Cherenkov radiation. Such a discrimination might be performed as well by using a processing of information from color channels of the camera. As explained above, the scintillator may be replaced by a thick (e.g., 2 cm layer of translucent material with a high refractive index (e.g., 1.5) or water, using Cerenkov radiation instead of scintillation light for the radiation detection.

FIG. 3C is a schematic representation of an anti-scattering grid 310 for use in a scintillating detector. For example, anti-scattering grid 310 may be used as anti-scattering grid 301c of FIGS. 3A and 3B. As depicted in FIG. 3C, grid 310 may comprise alternating strips 311a and 311b of a radiation absorbing substance (e.g., lead) and a radiolucent substance (e.g., plastic, carbon fibre, aluminium, paper, or the like).

FIG. 3D is a schematic representation of a pixel mask 320 for use in a scintillating detector. For example, pixel mask 320 may be used in addition to or in lieu of anti-scattering grid 301c of FIGS. 3A and 3B. Pixel mask 320 may be formed of a bulk material or may comprise a thin non-transparent sheet with one or more openings, e.g., opening 321a and 321b. Although depicted as elliptical, the openings may be any geometric shape, such as square, circular, hexagonal, or the like. Although depicted as of uniform shape, the openings may comprise different shapes. The mask may comprise a material having similar reflective properties as the scintillating layer, such that the light reflected at non-transparent parts of the mask may be representative for the reflection of scattered light in open parts of the mask. Accordingly, the light reflected at one or more of the non-transparent parts may be used for optical backscatter correction in post-processing. The mask, whether arranged as a regular pattern or in any other geometric configuration (or an arrangement of individual scintillating pixels, whether arranged as a regular pattern or in any other geometric configuration) may be used to determine the position of one or more elements of the scintillating surface on a resulting camera image. Thus, the mask or other arrangement of scintillating pixels may be used for the localization of points on the surface of the phantom and/or for distortion correction of a calculated dosimetric image.

FIG. 3E is a schematic representation of a distorted image 330 of the pixel mask 320 of FIG. 3D. For example, as shown in FIG. 3E a charge-coupled device (CCD) camera may distort the pattern in which the openings (such as openings 331a and 331b) are arranged. Accordingly, at least one processor (e.g., of a computer processing images from the camera) may correct distorted image 330 to corrected image 349 (shown in FIG. 3F) based on the known arrangement of the openings in pixel mask 320.

Figure 4:
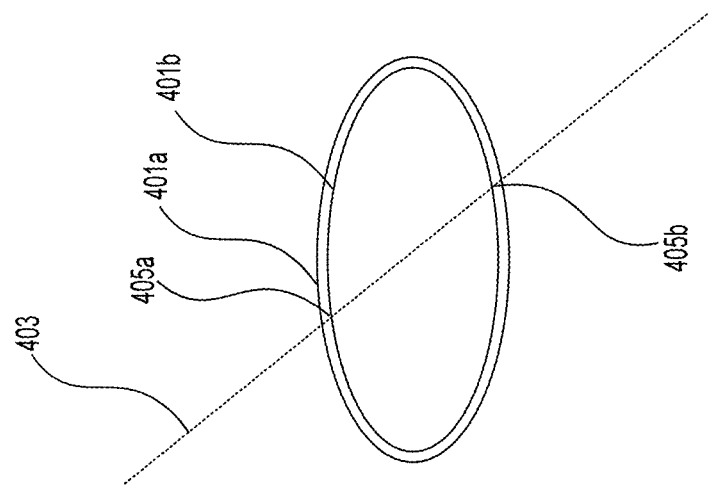
FIG. 4 is a schematic illustration of entry and exit points of a radiation beam into a scintillating detector, according to an exemplary embodiment of the present disclosure.

FIG. 4 is an example of a radiation beam 403 passing through a hollow phantom. Similar to FIGS. 1B, 2B, 3A, and 3B, the hollow phantom may comprise an outer surface 401a for receiving radiation from beam 403 and an inner surface 401b made of a scintillating material. Although not depicted in FIG. 4, the hollow phantom may further include one or more reflectors, an isocenter sensor, and/or an anti-scattering grid or anti-glare filter, as described above.

As depicted in FIG. 4, beam 403 intersects inner surface 401b at locations 405a and 405b. Accordingly, in an image of the hollow phantom of FIG. 4, the signal from inner surface 401b will appear near locations 405a and 405b. In embodiments having reflectors, the signal will also appear in locations where it is reflected. Accordingly, the profile of beam 403 may be determined using captured images, optionally mapped to information about the shape, density, and locations of inner surface 401b and, in embodiments with reflectors, of the reflectors.

Figure 5A:
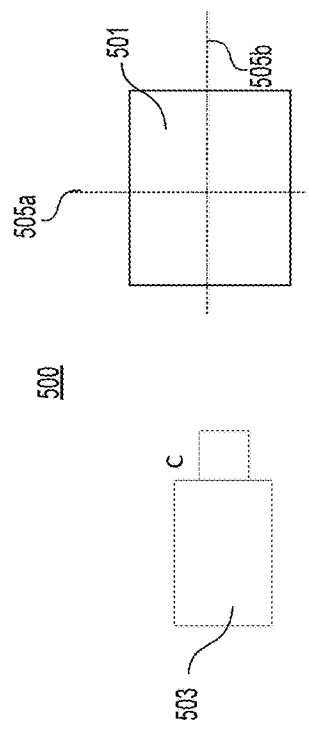
FIG. 5A is a schematic representation of a trunk-like scintillating detector, according to an exemplary embodiment of the present disclosure.

FIG. 5A is an example of a scintillating detector 500 having a symmetrical phantom 501. As depicted in FIG. 5A, phantom 501 has translational symmetry along axis 505b. Accordingly, axis 505a may represent a possible axis of entry for a beam.

Figure 5B:
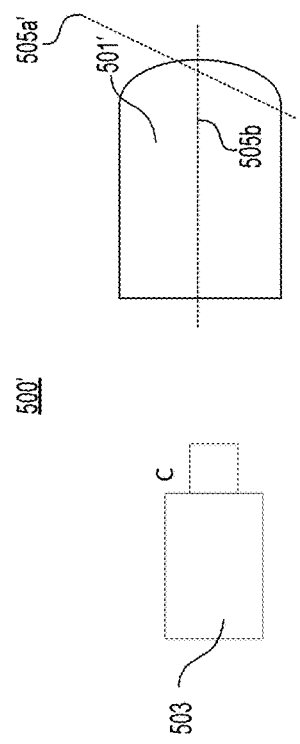
FIG. 5B is a schematic representation of a trunk-like scintillating detector with an end cap, according to an exemplary embodiment of the present disclosure.

FIG. 5B is an example of a scintillating detector 500' having a phantom 501' with an end cap. As depicted in FIG. 5B, phantom 501' is not symmetrical along axis 505b because of the end cap, which may be semi-spherical, semi-ellipsoid, or the like. Accordingly, axis 505a' may represent a possible axis of entry for a beam to phantom 501', an axis of entry not usable with phantom 501 of FIG. 5A.

Figure 5C:
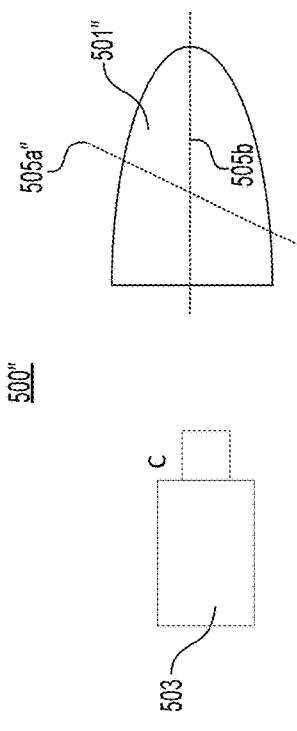
FIG. 5C is a schematic representation of a scintillating detector with continuously decreasing cross-sectional area, according to an exemplary embodiment of the present disclosure.

FIG. 5C is an example of a scintillating detector 500" having a phantom 501". As depicted in FIG. 5C, phantom 501" is not symmetrical along axis 505b because it has a decreasing cross-sectional area along axis 505b. The decrease may be continuous, as depicted in FIG. 5C, or may be partially discontinuous, e.g., having one or more lengths of constant or increasing cross-sectional area along axis 505b. Accordingly, axis 505a" may represent a possible axis of entry for a beam to phantom 501", an axis of entry not usable with phantom 501 of FIG. 5A or phantom 501' of FIG. 5B.

In all of FIGS. 5A, 5B, and 5C, camera 503 is configured to view an inner surface of the phantom. Although not depicted, computer 105 of FIG. 1A and/or computer 205 of FIG. 2A may also be included in any of detectors 500, 500', and 500".

Figure 6:
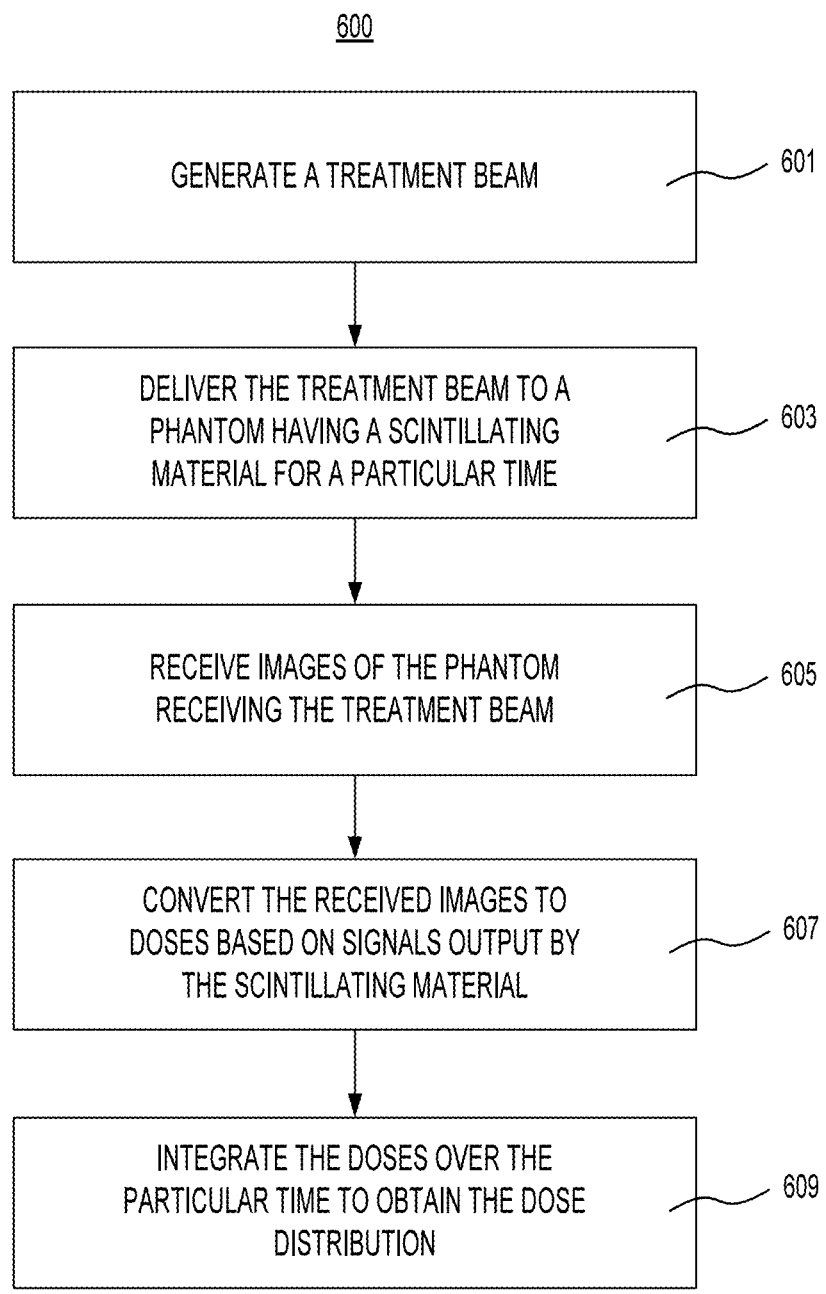
FIG. 6 is a flowchart of a method for determining a dose distribution of a radiation beam, according to an exemplary embodiment of the present disclosure.

FIG. 6 depicts method 600 for determining a dose distribution of a radiation beam. Method 600 may be performed by, for example, computer 105 of FIG. 1A, computer 205 of FIG. 2A, or any other general-purpose or special-purpose computing device.

At step 601, the processing device 105, 205 may control a beam generator to generate the radiation beam. For example, the processing device may control a linear accelerator (LINAC) system or other system that generates a radiation beam and directs it to a particular location.

At step 603, the processing device 105, 205 may control a delivery system to deliver the radiation beam to a phantom (e.g., phantom 101, phantom 201, phantom 301, phantom 501, phantom 501', or phantom 501") having a scintillating material for a particular time. For example, the processing device 105, 205 may control the linear accelerator, or a focal system that receives the beam generated by the linear accelerator, to direct the generated beam to the phantom. The phantom may comprise any phantom described above (e.g., phantom 101, phantom 201, phantom 301, phantom 501, phantom 501', or phantom 501") or otherwise consistent with the present disclosure.

At step 605, the processing device 105, 205 may receive images of the phantom receiving the radiation beam. For example, the processing device 105, 205 may receive the images from a camera 103 viewing the scintillating material of the phantom. Accordingly, the images may include one or more bright spots caused by a signal released from the scintillating material caused by the radiation beam. For example, the bright spots may represent the entry and exit points of the beam into the phantom.

The received images may comprise camera frames captured during the time of the radiation. The received images may also include frames captured before the radiation and/or after the radiation. In embodiments where the frames are monochromatic, the processing device 105, 205 may extract raw data from the received images, the raw data comprising intensity as a function of location (e.g., x and y components of pixels of the images) and time (e.g., depending on the frame from which the data is extracted). The processing device 105, 205 may transform the time measured in frames into absolute time (such as Coordinated Universal Time (UTC)) based on a reference absolute time, e.g., an absolute time for at least one frame, and a frame rate of the camera.

In embodiments where the frames are in color, the processing device 105, 205 may extract raw data from the images, the raw data comprising at least three sets of images (e.g., corresponding to red, blue and green channels), each with intensity as a function of location (e.g., x and y components of pixels of the images) and time (e.g., depending on the frame from which the data is extracted). In other color encoding schemes, a greater number of channels may be used. For example, a CYGM scheme may use four channels (cyan, yellow, green, magenta), a RGBE scheme may use four channels (red, green, blue, emerald), and a CMYW scheme may use four channels (cyan, magenta, yellow, and white). The processing device 105, 205 may combine the sets of images to generate a grayscale data set similar to the monochromatic data set described above.

At step 607, the processing device 105, 205 may convert the received images to representations of doses based on signals output by the scintillating material. For example, the processing device 105, 205 may calculate the representations of doses of the beam corresponding to the images based on brightness, wavelength, and/or other properties of the bright spots and known relations between the bright spot properties and the beam (e.g., which particles of the beam produce which wavelengths, which amplitudes of the beam produce which brightnesses, or the like).

Figure 7:
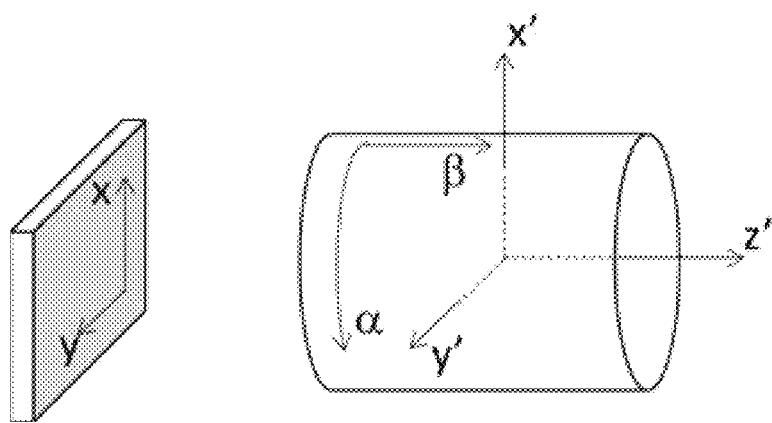
FIG. 7 is a schematic representation of coordinate systems for a scintillating detector and a camera, according to an exemplary embodiment of the present disclosure.

The processing device 105, 205 may use three reference frames when performing the conversion, as depicted in FIG. 7. As depicted in FIG. 7, (x,y) may indicate the two-dimensional frame of pixels of the camera and, accordingly, of the received images. As also depicted in FIG. 7, (x',y',z') may indicate the three-dimensional frame onto which, for example, the received images may be projected. As further shown, ($\alpha$,$\beta$) may indicate the two-dimensional frame of the hollow phantom.

In some embodiments, to convert the images to representations of doses, the processing device 105, 205 may apply one or more correction factors $\varepsilon_m$ to the intensities of the received images. For example, the one or more correction factors may account for the sensitivity of the scintillator, sensitivity of the camera 103, and/or dependence of intensity on parameters, such as beam quality, gain of the measurement chain, or the like. The processing device 105, 205 may multiply, convolve, or otherwise combine the correction factors with the intensities to perform the correction. Fourier transform algorithms might be applied to the raw images, processing applied in the momentum space and re-transformation performed. For example, the doses may comprise $d(x,y,t)=\Pi_m \varepsilon_m \cdot g(x,y,t)$, where $d(x,y,t)$ is the representation of a dose at location (x,y) and time t, $\varepsilon_m$ is a set of m correction factors, and $g(x,y,t)$ is the intensity of the images at location (x,y) and time t.

Before or after conversion to representations of doses, the processing device 105, 205 may apply pre-processing corrections to the intensities or dose representations, respectively. For example, the processing may subtract the background; perform uniformity correction, or the like. In one example, pre-processed intensities $g(x,y,t)=u(x,y)\cdot[f(x,y,t)-b(x,y)]$, where $f(x,y,t)$ represents the raw intensities at location (x,y) and time t, $b(x,y)$ represents the background in the images at location (x,y), and $u(x,y)$ represents a function imposing uniformity on the images.

The processing device 105, 205 may project the dose representations from the two-dimensional coordinates of the camera 103 to the two-dimensional phantom surface. Accordingly, the processing device 105, 205 may perform transformation $$d(x, y, t) \underset{\omega}{\to} d(\alpha, \beta, t),$$

where $\omega$ represents the transformation matrix between $d(x,y,t)$, which is the dose representation in the two-dimensional coordinate system (x,y) of the camera 103, and $d(\alpha,\beta,t)$, which is the dose representation in the two-dimensional coordinate system ($\alpha$,$\beta$) of the phantom surface. Alternatively, the processing device 105, 205 may project the intensities prior to converting the intensities to dose representations. That is, processing device 105, 205 may perform transformation $$g(x, y, t) \underset{\omega}{\to} g(\alpha, \beta, t),$$

presents the transformation matrix between $g(x,y,t)$, which is the intensities in the two-dimensional coordinate system (x,y) of the camera 103, and $g(\alpha,\beta,t)$, which is the intensities in the two-dimensional coordinate system ($\alpha$,$\beta$) of the phantom surface.

At step 609, the processing device 105, 205 may integrate the dose representations over the particular time to obtain the dose distribution. For example, the processing device 105, 205 may graph the calculated dose representations based on times at which the corresponding images were received from the camera 103. The processing device 105, 205 may additionally sum the graphed dose representations to obtain a total dose representation for the particular time.

Steps 607 and 609 may be reversed. Accordingly, the processing device 105, 205 may integrate the dose representations prior to transforming the dose representations to the coordinate system of the phantom (e.g., $d(x,y)=\Sigma_t d(x,y,t)$, because the dose representations $d(x,y,t)$ must be integrated discretely over frames rather than continuously over time). Additionally or alternatively, the processing device 105, 205 may integrate the intensities prior to converting the intensities to dose representations (e.g., $g(x,y)=\Sigma_t g(x,y,t)$) and/or prior to pre-processing the intensities.

Method 600 may further include additional steps. For example, method 600 may further include controlling a scanner to perform a scan of the phantom (e.g., phantom 101, phantom 201, phantom 301, phantom 501, phantom 501', or phantom 501") having the scintillating material. Accordingly, the processing device 105, 205 may control a scanner to perform (or may receive) a scan, such as a CT or MRI scan, of the phantom and determine a topography of the scintillating material based on the scan. In such embodiments, the processing device 105, 205 may use the scan to determine, at least in part, transformation matrix co, discussed above.

Accordingly, method 600 may include determining positional dose distributions based on the dose distribution and the scan of the phantom. In some embodiments, the processing device 105, 205 may map the graph of the calculated dose representations and/or the total dose to locations of the scintillating material on the phantom. Accordingly, the processing device 105, 205 may divide the graph of the calculated dose representations and/or the total dose representation between an entry point of the beam, an exit point of the beam, an isocenter, or any other locations to which the doses may be mapped.

In any of the embodiments described above, method 600 may further include comparing the dose distribution to a predicted dose distribution. For example, the processing device 105, 205 may transform a predicted dose representation from three-dimensional coordinates to two-dimensional coordinates on the phantom, e.g., $$D(x', y', z', t) \underset{\omega}{\to} D(\alpha, \beta, t),$$

where $D(x',y',z',t)$ is the predicted dose representation in a three-dimensional coordinate system $(x',y',z')$, and $D(\alpha,\beta,t)$ is the predicted dose representation in the two-dimensional coordinate system on the phantom $(\alpha,\beta)$. As explained above, the predicted dose representation may be based on a radiation treatment plan as well as a scan (e.g., a CT scan, an MRI scan, or the like) of the phantom. In embodiments where the doses are integrated over time, the processing device 105, 205 may integrate the predicted dose representations (or otherwise use a total predicted dose representation) for the transformation, $$D(x', y', z') \underset{\omega}{\to} D(\alpha, \beta).$$

Alternatively, method 600 may compare measured intensities to predicted intensities based on a predicted dose distribution. For example, alternatively to steps 607 and 609, described above, the processing device 105, 205 may convert a dose prediction to predicted intensities and integrate the predicted intensities to obtain an expected total measurement.

In one implementation of such an alternative embodiments, the processing device 105, 205 may project a predicted dose representation (either a predicted dose representation over time or an integrated dose representation) from three-dimensional coordinates to two-dimensional coordinates on the phantom. Based on properties of the scintillator, the processing device 105, 205 may determine a predicted amount of light emitted based on the dose representation, e.g., $D(\alpha,\beta,t') \to L(\alpha,\beta,t')$, where $D(\alpha,\beta,t')$ is the predicted dose representation in the two-dimensional coordinate system on the phantom $(\alpha,\beta)$, and $L(\alpha,\beta,t')$ is the predicted light intensity in the two-dimensional coordinate system on the phantom $(\alpha,\beta)$. Any non-ideality of the scintillator may be accounted for during this determination. For example, the sensitivity and other time-independent properties of the scintillator may be included in the determination in addition to time-varying quantities, such as gantry angle, spectrum, field size, dose rate, or the like.

The processing device 105, 205 may then project the predicted light from the two-dimensional coordinates of the phantom to the two-dimensional coordinates of the camera, e.g., $L(\alpha,\beta,t) \to G(x,y,t')$, where $L(\alpha,\beta,t')$ is the predicted light intensity in the two-dimensional coordinate system on the phantom $(\alpha,\beta)$, and $G(x,y,t')$ is the predicted light intensity in the two-dimensional coordinate system of the camera 103 $(x,y)$. The processing device 105, 205 may compare the predicted measurement $G(x,y,t')$ with the intensities measured by the camera (e.g., $g(x,y,t)$). The processing device 105, 205 may have pre-processed the intensities, as described above, prior to performing the comparison.

Time-resolved comparisons of $G(x,y,t')$ and $g(x,y,t)$ may include 3D methods, e.g., a 3D gamma analysis. Alternatively, time-resolved comparisons of $G(x,y,t')$ and $g(x,y,t)$ may include 2D methods (such as 2D gamma) based on interpolation of $G(x,y,t')$ and/or $g(x,y,t)$ across a common time axis such that the two functions may be compared directly at any time (e.g., $G(x,y,t')$ may be interpolated such that time $t'$ aligns with time $t$ or $g(x,y,t)$ may be interpolated such that time $t$ aligns with time $t'$).

Alternatively, as explained above, the processing device 105, 205 may integrate the predicted two sets of measurements (e.g., the predicted set G and the measured set g) over time prior to performing the comparison. For example, $G(x,y)=\Sigma_{t'} G(x,y,t')$ and $g(x,y)=\Sigma_{t} g(x,y,t)$ and then the processing device 105, 205 may compare $G(x,y)$ with $g(x,y)$. The integrated comparison may use reduced processing cycles compared to a time-dependent comparison, described above.

In any of the embodiments described above, method 600 may further include applying one or more corrections based on the comparison(s). For example, the processing device 105, 205 may perform at least one of energy correction and angular correction to bring the measured dose distribution (or the positional dose distributions) closer to the predicted dose distribution (or predicted positional dose distributions). The processing device 105, 205 may perform such corrections by adjusting the focal system controlled in step 603, described above.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A detector system for evaluating radiation delivered by a radiation beam output from a beam generator, comprising:
    a phantom enclosing an internal volume and having:
        an outer surface, extending around the internal volume, for exposure to radiation, and
        an inner surface comprising, at least in part, a scintillating material and facing the internal volume;
    a camera external to the enclosed volume and configured to view at least a portion of the inner surface, through an opening of the hollow phantom, when radiated by the radiation beam; and
    at least one processor configured to:
        receive images from the camera;
        adjust brightness of one or more first pixels corresponding with scintillating portions of the received images based on brightness of one or more second pixels corresponding with non-scintillating portions of the received images; and
        calculate, based on the adjusted images, a spatial dose distribution produced by the radiation delivered by the radiation beam to the hollow phantom.

2. The system of claim 1, wherein the phantom is translationally symmetric along at least one axis.

3. The system of claim 2, wherein the phantom is cylindrical.

4. The system of claim 2, wherein the phantom is not rotationally symmetric about the at least one axis.

5. The system of claim 4, wherein the phantom has an elliptical cross-section.

6. The system of claim 1, wherein the phantom has a conical shape.

7. The system of claim 1, wherein the phantom is made of plastic.

8. The system of claim 1, wherein the volume is filled with a light transparent material.

9. The system of claim 1, further comprising:
    one or more point sensors placed along an axis of the volume,
    wherein the point sensor is held in place by a holder connected to a wall of the phantom.

10. The system of claim 9, wherein the point sensor is made out of the scintillating material and is placed in a field of view of the camera.

11. The system of claim 1, further comprising:
    one or more reflective surfaces placed between the scintillating material and an axis of the phantom.

12. A method of determining a dose distribution of a radiation beam, comprising:
    controlling a radiation generator to generate the radiation beam;
    controlling a delivery system to deliver the radiation beam to a phantom with an outer surface, extending around an internal volume of the phantom, for exposure to radiation, and an inner surface comprising, at least in part, a scintillating material and facing the internal volume;
    receiving images of the phantom receiving the radiation beam;
    converting the received images to doses based on signals output by the scintillating material; and
    integrating the doses over time to obtain the dose distribution.

13. The method of claim 12, further comprising:
    applying one or more corrections to the measured images; and
    comparing the dose distribution to a predicted dose distribution.

14. The method of claim 13, wherein the one or more corrections include at least one of a correction for the incident energy, a correction for the energy distribution, and a correction for the angle of incidence.

15. A method of determining positional dose distributions of a radiation beam, comprising:
    controlling a scanner to perform a scan of a phantom with an outer surface, extending around an internal volume of the phantom, for exposure to radiation, and an inner surface comprising, at least in part, a scintillating material and facing the internal volume;
    controlling a radiation generator to generate the radiation beam;
    controlling a delivery system to deliver the radiation beam to the phantom;
    receiving images of the phantom receiving the radiation beam;
    converting the received images to doses based on signals output by the scintillating material;
    integrating the doses over time to obtain the dose distribution; and
    determining positional dose distributions based on the dose distribution and the scan of the phantom.

16. The method of claim 15, further comprising:
    applying one or more corrections to the measured images; and
    comparing the positional dose distributions to predicted positional dose distributions.

17. The method of claim 16, wherein the one or more corrections include at least one of a correction for the incident energy, a correction for the energy distribution, and a correction for the angle of incidence.

* * * * *